US010730408B2

(12) United States Patent
Masuda (10) Patent No.: US 10,730,408 B2
(45) Date of Patent: Aug. 4, 2020

(54) VEHICLE SEAT

(71) Applicant: TACHI-S CO., LTD., Akishima-shi, Tokyo (JP)

(72) Inventor: Yasuyuki Masuda, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/100,036

(22) Filed: Aug. 9, 2018

(65) Prior Publication Data

US 2019/0061567 A1 Feb. 28, 2019

(30) Foreign Application Priority Data

Aug. 25, 2017 (JP) ................. 2017-162093

(51) Int. Cl.
*B60N 2/07* (2006.01)
*B60N 2/02* (2006.01)
*B60N 2/08* (2006.01)

(52) U.S. Cl.
CPC ......... *B60N 2/0881* (2013.01); *B60N 2/0705* (2013.01); *B60N 2/085* (2013.01); *B60N 2/0825* (2013.01); *B60N 2002/0272* (2013.01)

(58) Field of Classification Search
CPC .. B60N 2/0705; B60N 2/0727; B60N 2/0812; B60N 2/0818; B60N 2/0825; B60N 2/0831; B60N 2/0837; B60N 2/0843; B60N 2/085; B60N 2/0856; B60N 2002/0272
See application file for complete search history.

(56) References Cited

U.S. PATENT DOCUMENTS

| 4,949,931 | A | * | 8/1990 | Fujiwara | B60N 2/0292 |
| | | | | | 248/429 |
| 5,106,144 | A | * | 4/1992 | Hayakawa | B60N 2/071 |
| | | | | | 248/429 |
| 6,053,529 | A | * | 4/2000 | Frusti | B60N 2/002 |
| | | | | | 248/429 |
| 6,095,555 | A | * | 8/2000 | Becker | B60N 2/0224 |
| | | | | | 280/735 |
| 6,275,026 | B1 | * | 8/2001 | Becker | B60N 2/0248 |
| | | | | | 324/207.2 |
| 2002/0125396 | A1 | * | 9/2002 | Kume | B60N 2/0224 |
| | | | | | 248/429 |
| 2003/0080598 | A1 | * | 5/2003 | Becker | B60N 2/0705 |
| | | | | | 297/341 |

(Continued)

FOREIGN PATENT DOCUMENTS

| JP | 2012-136138 A | 7/2012 |
| JP | 2016-049800 A | 4/2016 |

*Primary Examiner* — Kyle J. Walraed-Sullivan
(74) *Attorney, Agent, or Firm* — SGPatents PLLC (57) ABSTRACT

A vehicle seat includes a seat cushion, a seat back, a seat position adjusting device that moves and adjusts the seat cushion back and forth, and a seat position detector that detects a position of the seat cushion. The seat position adjusting device includes an upper rail that supports the seat cushion, a lower rail secured to a floor of a vehicle and configured to move the upper rail, a manipulation lever disposed inside with respect to the upper rail, and a bracket that is secured to the upper rail and supports the manipulation lever. The bracket includes a first portion that supports the manipulation lever, a second portion integratedly formed with the first portion and to which the seat position detector is mounted, and a slit that separates the first portion and the second portion.

6 Claims, 6 Drawing Sheets

(56) References Cited

U.S. PATENT DOCUMENTS

| | | | |
|---|---|---|---|
| 2004/0046433 A1* | 3/2004 | Nishide | B60N 2/002 297/344.11 |
| 2004/0113403 A1* | 6/2004 | Mills | B60N 2/0224 280/735 |
| 2005/0057065 A1* | 3/2005 | Endoh | B60N 2/0232 296/65.13 |
| 2005/0062467 A1* | 3/2005 | Barnabo | B60N 2/06 324/207.2 |
| 2006/0214402 A1* | 9/2006 | Lee | B60N 2/06 280/735 |
| 2006/0226328 A1* | 10/2006 | Matsumoto | B60N 2/0705 248/429 |
| 2006/0267385 A1* | 11/2006 | Steenwyk | B60N 2/002 297/217.1 |
| 2007/0013218 A1* | 1/2007 | Kayumi | B60N 2/0232 297/344.1 |
| 2010/0026283 A1* | 2/2010 | Nishide | B60N 2/06 324/207.26 |
| 2010/0219813 A1* | 9/2010 | Ito | B60N 2/0232 324/207.22 |
| 2011/0043010 A1* | 2/2011 | Diemer | B60N 2/07 297/217.3 |
| 2011/0101970 A1* | 5/2011 | Lanter | G01B 7/003 324/207.25 |
| 2012/0018608 A1* | 1/2012 | Nishide | B60N 2/067 248/429 |
| 2013/0206951 A1* | 8/2013 | Nagura | B60N 2/08 248/429 |
| 2014/0008510 A1* | 1/2014 | Ozawa | B60N 2/067 248/542 |
| 2014/0021322 A1* | 1/2014 | Nagura | B60N 2/0837 248/429 |
| 2014/0167742 A1* | 6/2014 | Moore | G01R 33/0088 324/207.2 |
| 2015/0001366 A1* | 1/2015 | Nakashima | B60N 2/0722 248/429 |
| 2016/0061860 A1* | 3/2016 | Kitou | B60N 2/07 73/431 |
| 2016/0362077 A1* | 12/2016 | Lanter | B60R 21/01 |
| 2017/0067761 A1* | 3/2017 | Kito | G01D 11/30 |
| 2017/0088016 A1* | 3/2017 | Frye | B60N 2/0244 |
| 2017/0096081 A1* | 4/2017 | Tsukamoto | B60R 21/01554 |
| 2017/0106771 A1* | 4/2017 | Bonk | B60N 2/06 |
| 2017/0261343 A1* | 9/2017 | Lanter | G01D 5/147 |
| 2018/0148011 A1* | 5/2018 | Zaugg | B60R 21/01554 |
| 2018/0334056 A1* | 11/2018 | Nagatani | B60N 2/0244 |
| 2019/0023155 A1* | 1/2019 | Beier | B60N 2/0244 |

* cited by examiner

VEHICLE SEAT

CLAIM OF PRIORITY

The present application claims priority from Japanese patent application JP2017-162093 filed on Aug. 25, 2017, the content of which is hereby incorporated by reference into this application.

BACKGROUND

This disclosure relates to a vehicle seat, and is applicable to a vehicle seat that includes, for example, a seat position adjusting mechanism.

A vehicle seat has an adjustment function to adjust a driving posture of an occupant corresponding to his/her physical size, for example, a seat slide device to adjust a front-rear position of the seat so as to safely and effortlessly manipulate a steering, a pedal, a lever, and switches when driving the vehicle, and so as to sufficiently look out over a road.

The seat slide devices are separately juxtaposed on both right and left sides of the seat, and lock mechanisms are provided on both sides. As means to simultaneously release locks to the lock mechanisms, a manipulation lever for releasing the locks is used. The manipulation lever is coupled to the lock mechanisms on both sides, formed by bending a pipe in an approximately U shape as seen in a plan view so as to have arm portions on right and left sides, what is called a towel bar shape (for example, JP2012-136138). Such lock release lever in the towel bar shape is usually disposed so as to bridge upper rails of the seat slide device separately juxtaposed on the right and left sides via a holder configured to swing in an up-down direction.

Some vehicle seats include a slide position detecting device that includes a magnetic detector mounted to a movable rail (an upper rail) and a detected portion mounted to a position facing the magnetic detector on a fixed rail (a lower rail). Then, when the movable rail slides on the fixed rail, a slide position is detected by sensing whether or not the detected portion is present on the position facing the magnetic detector (for example, JP2016-49800).

SUMMARY

Disposing both the manipulation lever and a seat position detector such as the magnetic detector inside the lower rail in a right-left direction increases the number of components.

It is an object of this disclosure to provide a vehicle seat with a small number of components.

Other objects and novel features will become clear by descriptions and attached drawings in this Description.

An outline of a representative embodiment of this disclosure is briefly described as follows.

That is, a vehicle seat includes a seat cushion, a seat back, a seat position adjusting device that moves and adjusts the seat cushion back and forth, and a seat position detector that detects a position of the seat cushion. The seat position adjusting device includes an upper rail that supports the seat cushion, a lower rail secured to a floor of a vehicle and configured to move the upper rail, a manipulation lever disposed inside with respect to the upper rail, and a bracket that is secured to the upper rail and supports the manipulation lever. The bracket includes a first portion that supports the manipulation lever, a second portion integratedly formed with the first portion and to which the seat position detector is mounted, and a slit that separates the first portion and the second portion.

With the above-described vehicle seat, the number of components can be reduced.

DESCRIPTION OF THE PREFERRED EMBODIMENTS

The following describes an embodiment by referring to the drawings. Note that, in the following description, identical reference numerals designate components having identical functions or configurations, and therefore overlapping explanation is omitted in some cases. For clearer explanations, the drawings are schematically illustrated in width, thickness, shape, and similar factor of each unit compared with an actual aspect in some cases. However, they are merely examples, and not intended to limit interpretations of the present invention.

Embodiment

Figure 1:
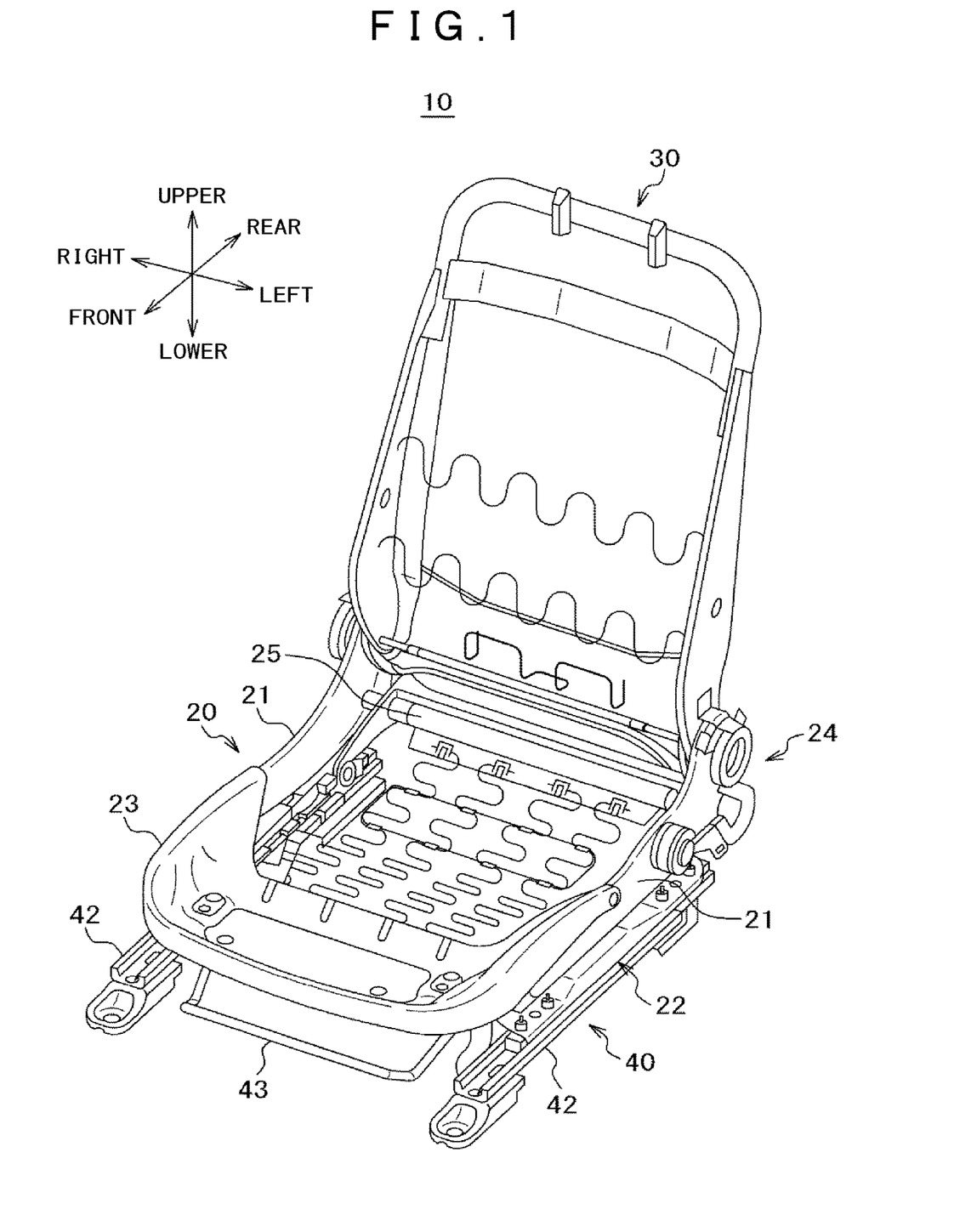
FIG. 1 is a perspective view describing an exemplary configuration of a seat frame viewed from a left front side.

First, a structure of a vehicle seat according to an embodiment will be described by referring to FIG. 1. FIG. 1 is a perspective view describing an exemplary configuration of a seat frame viewed from a left front side. For ease of understanding a structure of the vehicle seat, directions of "front," "rear," "left," "right," "upper," and "lower" are indicated in the drawings, and these directions are used for expressing relative positional relationships in the following description. These directions correspond to directions of a vehicle when the vehicle seat is mounted to the vehicle, and for example, a front direction of the vehicle seat is identical to a front direction of the vehicle. While the following describes the structure of the vehicle seat appropriate for a driver's seat positioned on a left front side, the structure is applicable to a driver's seat positioned on a right front side. The vehicle seat mounted on the right side of the vehicle has a configuration where the right and left sides of the vehicle seat mounted on the left side are interchanged.

The vehicle seat according to the embodiment includes a seat cushion configured to move back and forth, and a seat back tiltable with respect to the seat cushion. The seat cushion and the seat back include a seat frame 10 as illustrated in FIG. 1. The seat frame 10 includes a seat cushion frame 20 that constitutes a frame of the seat cushion, and a seat back frame 30 that constitutes a frame of the seat back. The seat cushion is configured such that the seat cushion frame 20 is covered with a seat cushion pad made of a cushion material such as urethane and a skin material made of synthetic leather, a fabric, or similar material. The seat back is configured such that the seat back frame 30 is covered with a seat back pad made of a cushion material such as urethane and a skin material made of synthetic leather, a fabric, or similar material.

The seat cushion frame 20 is a frame formed in an approximately rectangular frame shape, and disposed on respective upper rails 41 supported to be movable back and forth with respect to a pair of right and left lower rails 42 disposed on a floor of the vehicle. This ensures an adjustment of a front-rear position of the vehicle seat.

The seat back frame 30 has a lower portion turnably coupled to a rear portion of the seat cushion frame 20 via a reclining mechanism 24. This ensures the seat back to be tiltable in the front-rear direction with respect to the seat cushion.

Next, the seat cushion frame will be described in detail. As illustrated in FIG. 1, the seat cushion frame 20 mainly includes a pair of right and left side frames 21, a pair of right and left upper risers 22, a pan frame 23, a pair of front and rear coupling pipes 25.

The side frames 21 are metallic frames extending in the front-rear direction, and separately disposed on the right and left sides. The side frame 21 has a front end portion coupled with the metallic pan frame 23 and the metallic front coupling pipe 25, and a rear end portion coupled with the metallic rear coupling pipe 25.

On a lower side of the seat cushion frame 20, a seat position adjusting device 40 is disposed to adjust the front-rear position of the seat cushion with respect to the vehicle. The seat position adjusting device 40 includes a pair of right and left upper rails 41 secured to the lower side of the seat cushion frame 20, and lower rails 42 secured to the floor of the vehicle. The upper rails 41 are secured to the upper risers 22 disposed at a lower portion of the seat cushion frame 20. The lower rail 42 includes a rail portion 42a engaged with the upper rail 41 to slide the upper rail 41, and fastening portions 42b and 42c that fasten the rail portion 42a to the floor. Sliding the upper rail 41 on the lower rail 42 ensures adjusting the front-rear position of the seat cushion with respect to the vehicle, that is, the front-rear position of the vehicle seat with respect to the vehicle. The seat position adjusting device 40 includes a manipulation lever 43. The manipulation lever 43 can be used for manipulating a front-rear slide (a front-rear movement) of the upper rail 41 on the lower rail 42. Releasing a lock with the manipulation lever 43 allows the front-rear slide (the front-rear movement) of the upper rail 41 on the lower rail 42.

Figure 2:
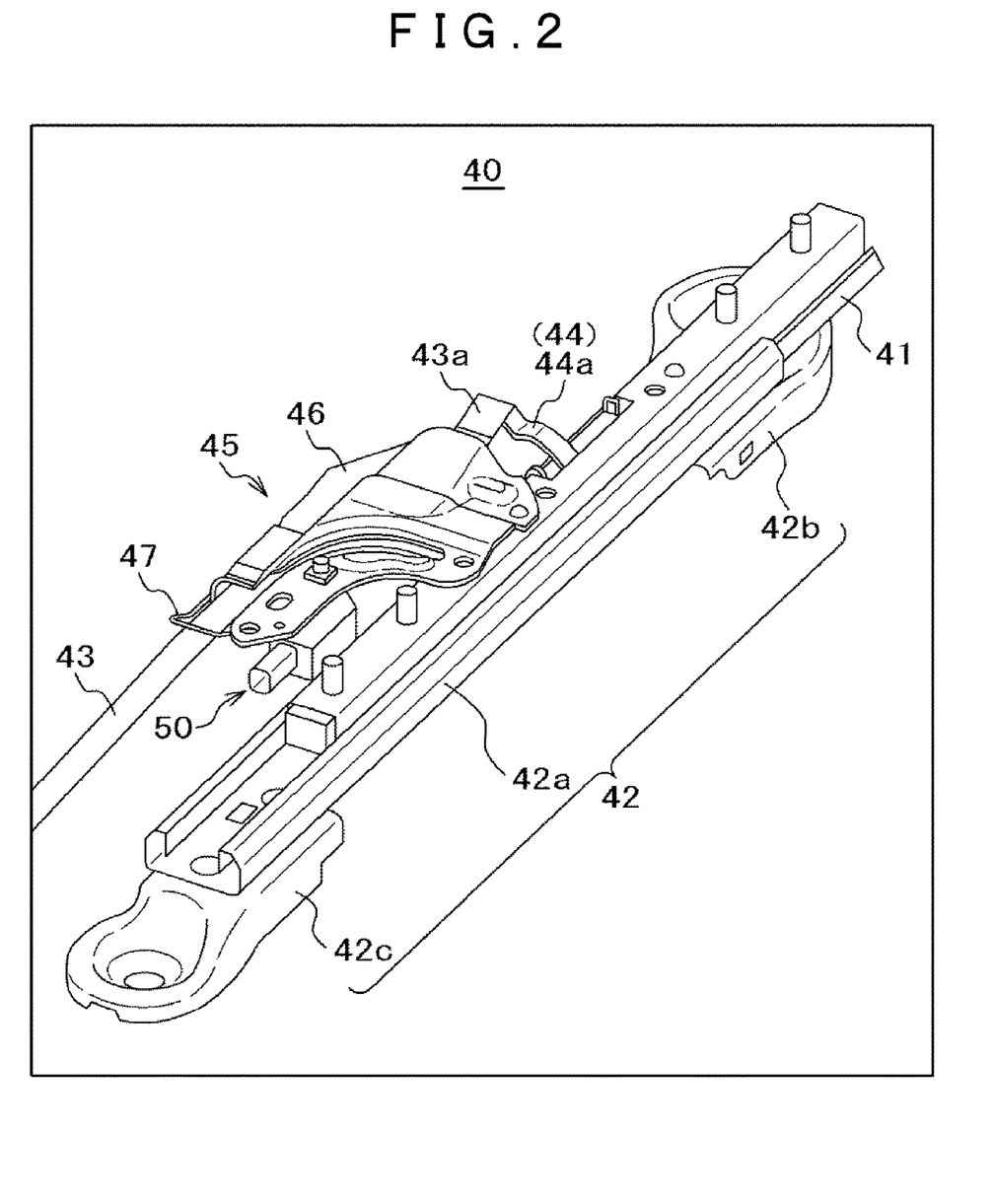
FIG. 2 is a perspective view illustrating a seat position adjusting device on a left side in FIG. 1 viewed from the left front side.
Figure 3:
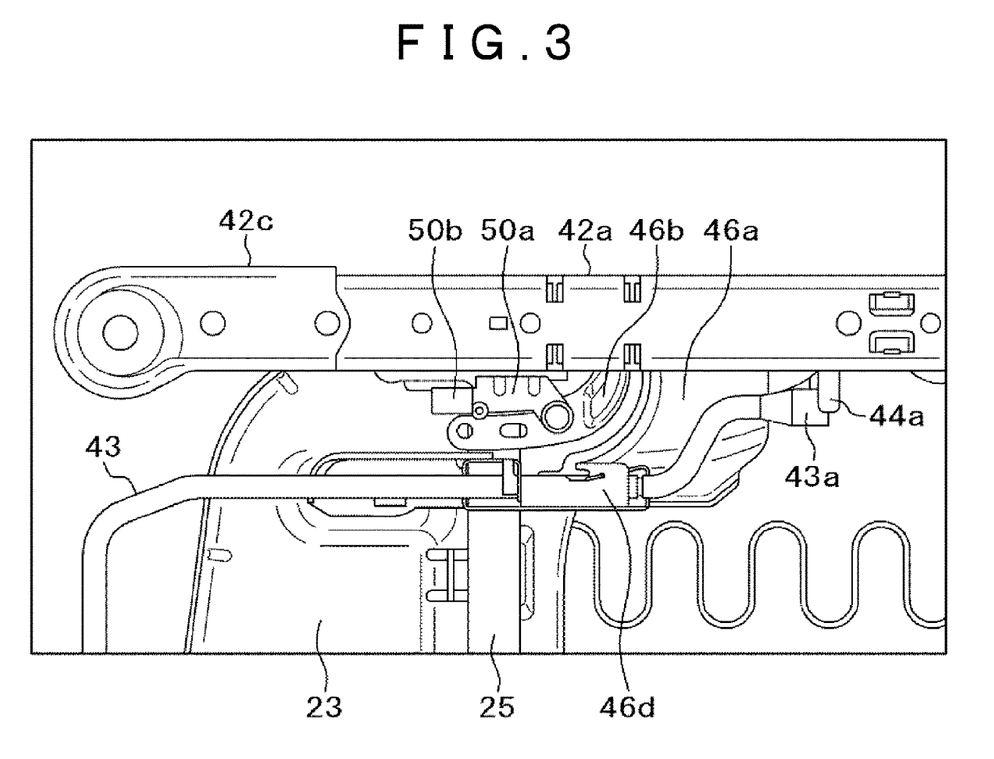
FIG. 3 is a bottom view of the seat position adjusting device on the left side in FIG. 1.

Next, the seat position adjusting device will be described in detail by referring to FIG. 2 and FIG. 3. FIG. 2 is a perspective view illustrating a seat position adjusting device on a left side in FIG. 1 viewed from the left front side. FIG. 3 is a bottom view of the seat position adjusting device on the left side in FIG. 1.

The seat position adjusting device 40 includes a lock mechanism 44 that restricts the front-rear movement of the upper rail 41, and a lock-releasing mechanism 45 that releases the restriction on the front-rear movement of the upper rail 41 at an engaging portion in conjunction with the manipulation of the U-shaped manipulation lever 43 to set the front-rear position of the vehicle seat to a desired position.

The lock mechanism 44 includes a stopper 44a mounted to the upper rail 41 and a plate-shaped spring (not illustrated) that provides a biasing force to the stopper 44a.

The lock-releasing mechanism 45 includes the manipulation lever 43 that causes the stopper 44a to operate, a bracket 46 that supports the manipulation lever 43, and a wire-shaped spring 47 that provides a biasing force to the manipulation lever 43.

More specifically, as illustrated in FIG. 2, the lock-releasing mechanism 45 is usually biased around a manipulation lever supporting portion 46d of the bracket 46 in a counterclockwise direction by the biasing force of the wire-shaped spring 47, and the manipulation lever 43 is moved down while an end portion 43a of the manipulation lever 43 separates from the stopper 44a. Thus, the stopper 44a maintains a lock state without receiving the force. Accordingly, the front-rear movement of the upper rail 41 is restricted.

In this state, when a seated person on the vehicle seat manipulates the manipulation lever 43 upward, the manipulation lever 43 turns around the manipulation lever supporting portion 46d in a clockwise direction against the biasing force of the wire-shaped spring 47. This turning causes the end portion 43a of the manipulation lever 43 to move the stopper 44a downward against the biasing force of the wire-shaped spring 47. This downward move of the stopper 44a releases the seat position adjusting device 40 from the lock state, and then, the upper rail 41 can move back and forth while being guided by the lower rail 42.

Accordingly, the seated person can set the position of a vehicle seat 1 to a desired front-rear position by shifting his/her waist while manipulating the manipulation lever 43 upward. Then, when the seated person takes his/her hand off the manipulation lever 43 in the state where the desired front-rear position is determined, the manipulation lever 43 moves to a lower position by the biasing force of the wire-shaped spring 47, and the end portion 43a of the manipulation lever 43 turns around the manipulation lever supporting portion 46d in the clockwise direction. Thus, the front-rear movement of the upper rail 41 is locked again as described above.

Figure 4:
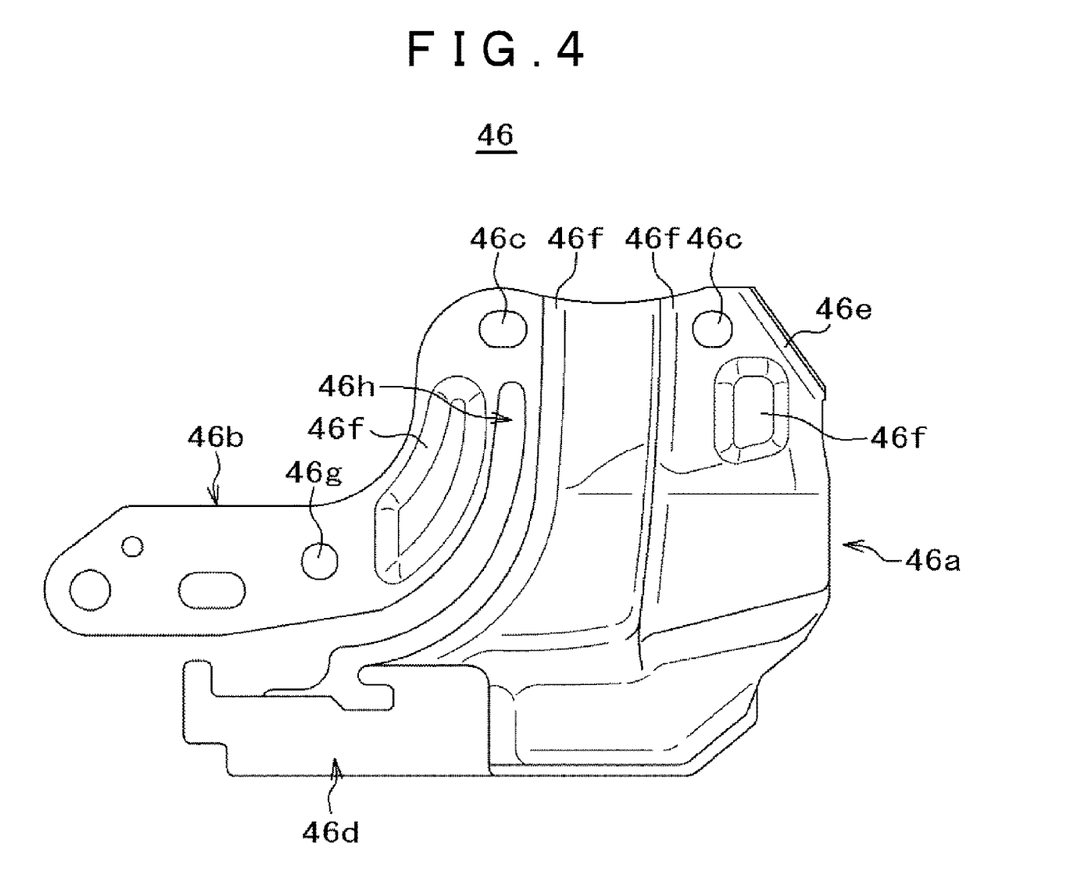
FIG. 4 is a bottom view of a bracket in FIG. 2.
Figure 5:
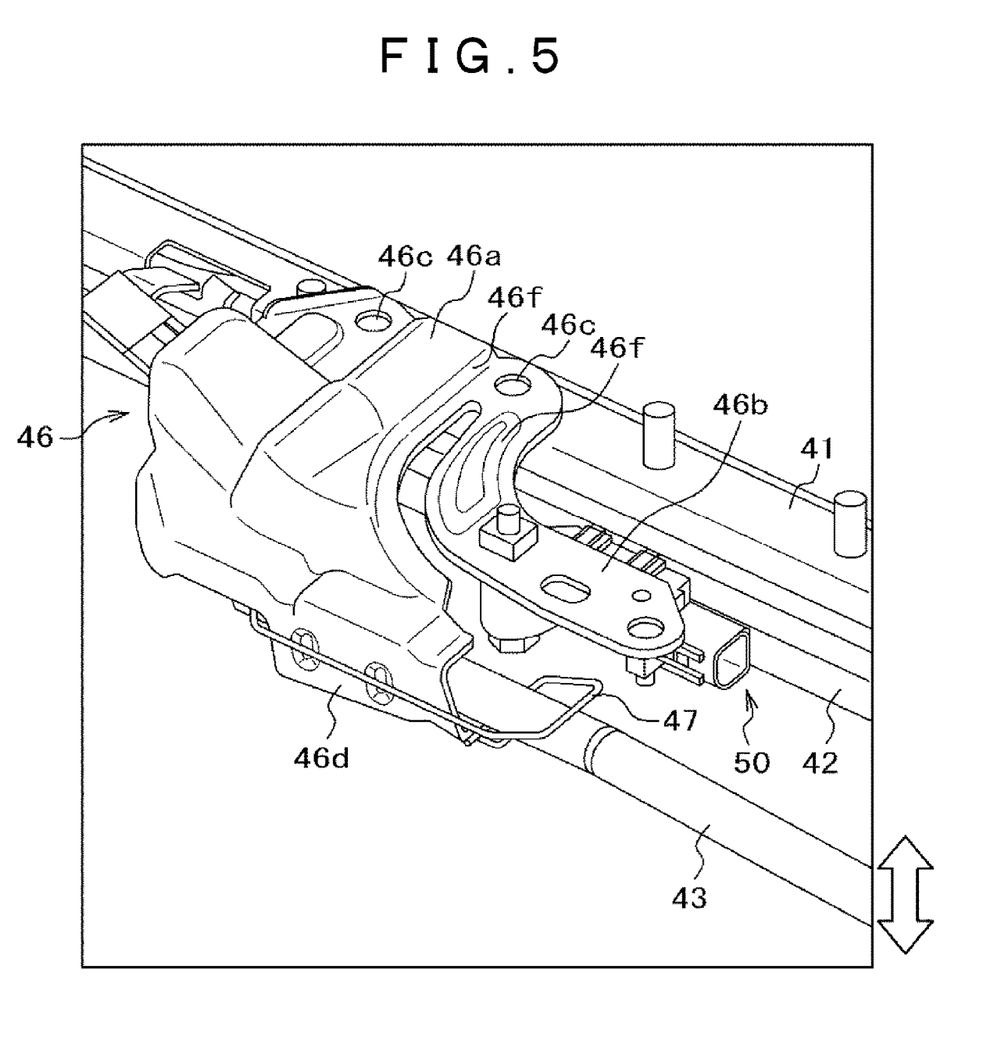
FIG. 5 is a perspective view illustrating the seat position adjusting device on the left side in FIG. 1 viewed from a right front side.
Figure 6A:
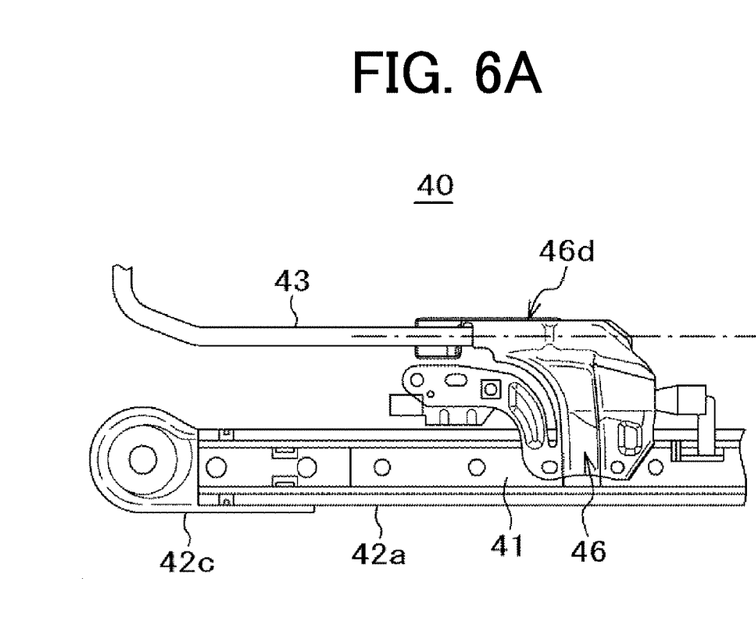
FIG. 6A and FIG. 6B are drawings describing an effect of the bracket in FIG. 5.
Figure 6B:
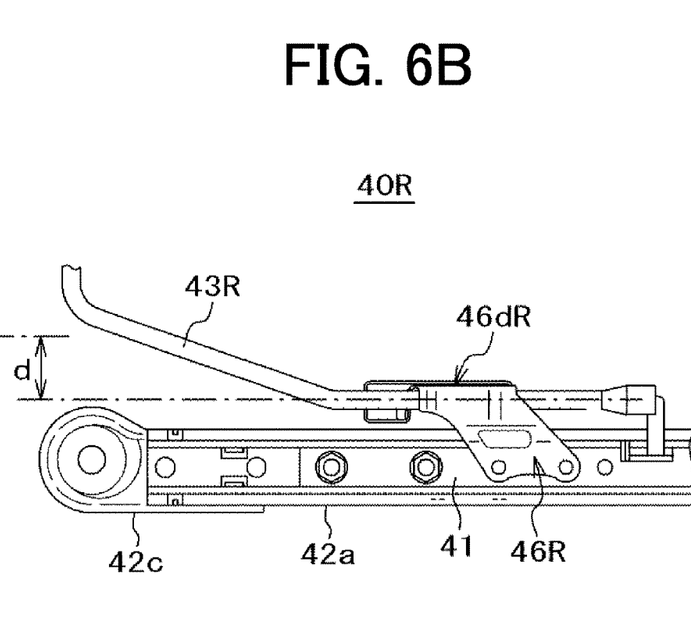

Next, the bracket 46 will be described by referring to FIG. 4 to FIG. 6B. FIG. 4 is a bottom view of a bracket in FIG. 2. FIG. 5 is a perspective view illustrating the seat position adjusting device on the left side in FIG. 1 viewed from a right front side. FIG. 6A and FIG. 6B are drawings describing an effect of the bracket. FIG. 6A is a top view illustrating the seat position adjusting device on the left side in FIG. 1, and FIG. 6B is a top view illustrating a seat position adjusting device on a left side of a vehicle seat according to a comparative example.

The bracket 46 is made of a metal plate, and includes, as illustrated in FIG. 4, a first portion 46a that supports the manipulation lever 43, a second portion 46b to which a seat position detector 50 is mounted, and two holes 46c for securing the bracket 46 to the upper rail 41 with fastening members. The first portion 46a includes the manipulation lever supporting portion 46d that supports the manipulation lever 43 so as to sandwich the manipulation lever 43, a flange 46e and a bead 46f that enhance rigidity of the first portion 46a. The manipulation lever supporting portion 46d has a top wall, a sidewall extending downward from an end portion of the top wall, a bottom wall extending to the upper rail 41 side from an end portion of the sidewall, and a lock portion that locks the wire-shaped spring 47. The second portion 46b has the bead 46f that enhances rigidity of the second portion 46b, and a hole 46g for installing the seat position detector 50. The first portion 46a and the second portion 46b are separated by a slit 46h. One hole 46c is positioned on the first portion 46a, and the other hole 46c is positioned near a boundary between the first portion 46a and the second portion 46b. The slit 46h is positioned between the manipulation lever supporting portion 46d and the hole 46g. A distance between the other hole 46c and the manipulation lever supporting portion 46d is longer than a distance between the other hole 46c and the hole 46g. The bracket 46 is secured to the upper rail 41 with bolts as the fastening members via the two holes 46c.

The slit 46h is a clearance provided between the first portion 46a and the second portion 46b of the bracket 46. The slit 46h is formed in a shape such that, when the bracket 46 is secured to the upper rail 41, the bracket 46 has no portion that physically couples the first portion 46a to the second portion 46b excluding the secured portion. In this embodiment, the slit 46h is an arc-shaped elongated slit. However, the shape of the slit is not limited to this, may be a straight line shape or a bent rectangular shape, or may be a combination of these shapes and a curved line. A width of the slit is only necessary to be a width for separating the first portion and the second portion, and the width is not required to be uniform. For example, the slit may be formed to have the width increasing as separating from the secured portion.

As illustrated in FIG. 6A, since the seat position detector 50 is disposed between the rail portion 42a of the lower rail 42 and the manipulation lever 43, the manipulation lever supporting portion 46d of the bracket 46 is shifted from the upper rail 41 to the inside of the seat in the right-left direction by d compared with a manipulation lever supporting portion 46d R of a bracket 46R of the comparative example illustrated in FIG. 6B. As indicated by an arrow in FIG. 5, moving the manipulation lever 43 up and down causes the bracket 46 to be easily twisted compared with the bracket 46R. However, the flange 46e and the bead 46f disposed on the bracket 46 can enhance the rigidity.

Next, the seat position detector will be described by referring to FIG. 2 and FIG. 3.

As illustrated in FIG. 2, the seat position detector 50 is mounted facing the inner sidewall of the lower rail 42 via the bracket 46. As illustrated in FIG. 3, the seat position detector 50 includes a detector body 50a and a cable coupling portion 50b. The detector body 50a is mounted to the second portion 46b of the bracket 46. The detector body 50a includes a magnet and a magnetic sensor. The seat position detector 50 is configured such that when the detector body 50a reaches a predetermined position on the front side, the seat position detector 50 senses a magnetic change, and the detector body 50a outputs this sensed signal via a cable (not illustrated) coupled to the cable coupling portion 50b.

The second portion 46b of the bracket 46 extends from the upper rail 41 to the inside in a horizontal direction, and then, gradually extends forward. Then, the seat position detector 50 is secured to the second portion 46b of the bracket 46 with a securing member inserted through the hole 46g formed on the second portion 46b of the bracket 46.

The seat position detector 50 is positioned between the lower rail 42 and the manipulation lever 43 as seen in a plan view, and the detector body 50a is positioned between the lower rail 42 and the second portion 46b of the bracket 46 as seen in a plan view. The detector body 50a of the seat position detector 50 is positioned on an opposite side of the slit 46h across the second portion 46b as seen in a plan view.

Next, a detection behavior of the seat position will be described. First, a user pulls the manipulation lever 43 upward to release the lock of the upper rail 41 to the lower rail 42, thus allowing the seat cushion to slide in the front-rear direction. For example, the user moves the seat cushion to the most front position and takes his/her hand off the manipulation lever 43, thus securing the seat cushion. At this time, the seat position detector 50 detects that the seat cushion is located on a predetermined position set in advance.

In the embodiment, the seat position detector and the manipulation lever are assembled to be secured by the integrated bracket. The integrated bracket is assembled to be secured to the upper rail with the bolt as the fastening member. Configuring the components in different use as one component structure ensures reducing the number of components. The slit disposed on the bracket can reduce the transmission of the strain generated in the manipulation of the manipulation lever to the seat position detector. Since the bracket includes the flange and the bead to enhance the rigidity, the bracket is less likely to be twisted in spite of the shifted position of the manipulation lever.

While the invention made by the inventors has been specifically described based on the embodiment, this invention is not limited to the above-described embodiment, and obviously, variously changeable.

For example, while the example where the seat position detector 50 is disposed on the seat position adjusting device on the left side has been described in the embodiment, the seat position detector 50 may be disposed on the seat position adjusting device on the right side.

What is claimed is:

1. A vehicle seat comprising:
   a seat cushion;
   a seat back;
   a seat position adjusting device that moves and adjusts the seat cushion back and forth; and
   a seat position detector that detects a position of the seat cushion,
   wherein the seat position adjusting device includes:
      a lower rail secured to a floor of a vehicle;
      an upper rail that supports the seat cushion, the upper rail sliding along the lower rail;
      a manipulation lever disposed inside with respect to the lower rail and extending along the lower rail; and
      a bracket secured to the upper rail, the bracket supporting the manipulation lever,
   wherein the bracket includes:
      a first portion that supports the manipulation lever;
      a second portion integrally formed with the first portion, the seat position detector being mounted to the second portion;
      a slit that separates the first portion and the second portion as seen in a plan view, so as to reduce transmission of strain generated by manipulation of the manipulation lever to the seat position detector;
      a first hole located in the first portion; and
      a second hole located between the first portion and the second portion; and
   wherein the bracket is fixed to the upper rail by fastening members at a position of the first hole and a position of the second hole.

2. The vehicle seat according to claim 1,
   wherein the seat position detector is positioned between the lower rail and the manipulation lever as seen in a plan view.

3. The vehicle seat according to claim 2,
   wherein the bracket is secured to a top surface of the upper rail, and the bracket includes a flange and a bead.

4. The vehicle seat according to claim 3,
   wherein the first portion includes a manipulation lever supporting portion that supports the manipulation lever so as to sandwich the manipulation lever, and a mounting position of the seat position detector on the second portion is positioned between the manipulation lever supporting portion and the upper rail as seen in a plan view.

5. The vehicle seat according to claim 2, wherein the seat position detector is mounted facing an inner sidewall of the lower rail.

6. The vehicle seat according to claim 1, wherein the first portion is located more toward a rear side in a front-rear direction of the vehicle seat than the second portion.

\* \* \* \* \*